United States Patent [19]

Shinkai et al.

[11] Patent Number: 5,368,988
[45] Date of Patent: Nov. 29, 1994

[54] OPTICAL RECORDING MEDIUM

[75] Inventors: Masahiro Shinkai, Chiba; Kenryo Namba, Tokyo, both of Japan

[73] Assignee: TDK Corporation, Tokyo, Japan

[21] Appl. No.: 116,603

[22] Filed: Sep. 7, 1993

[30] Foreign Application Priority Data

Sep. 11, 1992 [JP] Japan .................. 4-269446
Feb. 25, 1993 [JP] Japan .................. 5-60890

[51] Int. Cl.$^5$ .......................... G11B 7/00; G03C 1/00
[52] U.S. Cl. ................................ 430/270; 430/945; 430/495; 369/288; 346/135.1
[58] Field of Search ................ 430/495, 945, 270; 346/135.1; 369/288

[56] References Cited

U.S. PATENT DOCUMENTS

| | | | |
|---|---|---|---|
| 4,320,489 | 3/1982 | Crandell et al. | 369/275.2 |
| 4,871,601 | 10/1989 | Miura et al. | 430/945 |
| 4,954,380 | 9/1990 | Kanome et al. | 430/945 |
| 5,028,467 | 7/1991 | Maruyama et al. | 430/945 |

OTHER PUBLICATIONS

Organosulfur Derivatives of the Metal Carbonyls. V. The Reactions between Certain Organic Sulphur Compounds and Various Cyclopentadienyl Metal Carbonyl Derivatives; King; pp. 1587–1591. Jun. 1963.

Transition Metal Dithiolate Complexes. I. Cyclopentadienyl Maleonitrile Dithiolate Compounds; Locke et al.; pp. 1157–1161. Jul. 1966.

DuBois et al "Characterization and Reaction Studies of . . . Acetylene to Ethylene" J. Am. Chem. Soc. 101(18) 5245–5252 (Aug. 1979).

*Primary Examiner*—Charles L. Bowers, Jr.
*Assistant Examiner*—Martin J. Angenbrandt
*Attorney, Agent, or Firm*—Watson, Cole, Grindle & Watson

[57] ABSTRACT

An optical recording medium includes on a substrate a recording layer which contains a dye and a quencher. A specific cyclopentadiene metal complex is used as the quencher or the dye/quencher. Use of the metal complex facilitates a coating step due to improved solubility.

10 Claims, 1 Drawing Sheet

OPTICAL RECORDING MEDIUM

FIELD OF THE INVENTION

This invention relates to an optical recording medium, and more particularly, to an optical recording disk having a recording layer in the form of a dye film.

BACKGROUND OF THE INVENTION

Optical recording disks of the write-once, rewritable and other types have been of great interest as high capacity information bearing media. Optical recording disks of one type use a dye film as a recording layer. From a structural aspect, there are known disks of the air-sandwich structure having an air space on a recording layer or dye film and disks of the close contact type having a reflective layer in close contact with a recording layer composed of a dye film which can be reproduced in accordance with the compact disk (CD) standards. See Nikkei Electronics, Jan. 23, 1989, No. 465, page 107; the Functional Dye Department of the Kinki Chemical Society, Mar. 3, 1989, Osaka Science & Technology Center; and Proceedings SPIE—The International Society for Optical Engineering, Vol. 1078, pp. 80–87, "Optical Data Storage Topical Meeting", 17–19, Jan. 1989, Los Angels.

For the dyes used to form the recording layers, indolenine series cyanine dyes are preferred because of heat resistance and water resistance as disclosed in Japanese Patent Application Kokai (JP-A) No. 24692/1984 and other patent publications. However, the indolenine series cyanine dyes have the drawback that they tend to deteriorate with reproduction, that is, by repetitive irradiation of reproducing light or optically deteriorate during light room storage. It was thus proposed and has been practiced to use the dye in admixture with a metal complex quencher as disclosed in JP-A 59795/1984. Among such metal complexes, bis(phenylenedithiol) nickel complexes are highly effective in protecting the cyanine dyes from deterioration by repetitive reproduction and optical deterioration. Undesirably, these complexes are low soluble as demonstrated by a solubility of less than 1% in alcohols such as methanol. It is then impossible to form a recording layer by coating a solution of the complex in such a solvent. Also the metal complex has an absorption wavelength of 700 to 1,000 nm and can affect the absorption of the dye, eventually resulting in a lowering of reflectivity and hence a lowering of reproduced output.

With regard to the dyes, reference is made to "Chemistry of Functional Dyes", CMC Publishing K.K., pages 74–76 as well as the following patent applications.

| Japanese Patent Application Kokai (JP-A) Nos. | | |
| --- | --- | --- |
| 24692/1984 | 55794/1984 | 55795/1984 |
| 81194/1984 | 83695/1984 | 18387/1985 |
| 19586/1985 | 19587/1985 | 35054/1985 |
| 36190/1985 | 36191/1985 | 44554/1985 |
| 44555/1985 | 44389/1985 | 44390/1985 |
| 47069/1985 | 20991/1985 | 71294/1985 |
| 54892/1985 | 71295/1985 | 71296/1985 |
| 73891/1985 | 73892/1985 | 73893/1985 |
| 83892/1985 | 85449/1985 | 92893/1985 |
| 159087/1985 | 162691/1985 | 203488/1985 |
| 201988/1985 | 234886/1985 | 234892/1985 |
| 16894/1986 | 11292/1986 | 11294/1986 |
| 16891/1986 | 08384/1986 | 14988/1986 |
| 163243/1986 | 210539/1986 | 30083/1987 |
| 32132/1987 | 31792/1987 | |

| Japanese Patent Application Kokai (JP-A) Nos. |
| --- |
| Japanese Patent Application No. 54013/1985 |

SUMMARY OF THE INVENTION

Therefore, a primary object of the present invention is to provide an optical recording medium having a recording layer containing a dye and a quencher wherein the quencher is sufficiently soluble to facilitate formation of the recording layer which has high reflectivity and is minimized in deterioration by repetitive reproduction and optical deterioration.

Another object of the present invention is to provide such an optical recording medium having a high degree of modulation.

According to the present invention, there is provided an optical recording medium comprising on a substrate a recording layer which contains a dye and a quencher. At least the quencher is a complex of formula (1) or a dimer thereof.

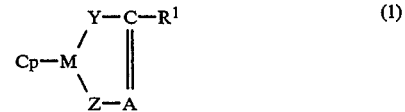

In formula (1), Cp is cyclopentadiene; A is $C-R^2$ or N; $R^1$ and $R^2$ are independently selected from the group consisting of a hydrogen atom, halogen atom, alkyl, aryl, cyano, ether, ester, acyl, alkylthio, sulfamoyl, alkylsulfonyl, heterocyclic, and nitro radical, or $R^1$ and $R^2$ taken together may form a ring when A is $C-R^2$; Y and Z are independently selected from the group consisting of S, Se, O and $NR^3$ wherein $R^3$ is a hydrogen atom or alkyl or phenyl radical; and M is a metal atom. The cyclopentadiene represented by Cp may have at least one substituent selected from the group consisting of an alkyl, aryl, ether, ester, acyl radical and halogen atom.

Preferably, the quencher is a complex of formula (2).

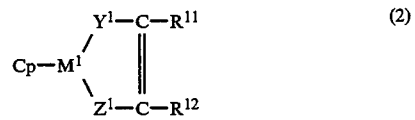

In formula (2), Cp is cyclopentadiene; $Y^1$ and $Z^1$ are independently S, Se or $NR^3$ wherein $R^3$ is a hydrogen atom or alkyl or phenyl radical; $R^{11}$ and $R^{12}$ are independently a hydrogen atom or a monovalent substituent having a Hammett's $\sigma$ value of at least 0, or $R^{11}$ and $R^{12}$ taken together may form a ring; and $M^1$ is cobalt, nickel or rhodium. Preferably, the dye is a cyanine dye, more preferably a cyanine dye having an indolenine ring. The dye has absorption maximum at 600 to 900 nm.

In another embodiment, the recording layer contains a dye in the form of a complex of formula (1).

It is to be noted that the complexes of formula (1) are disclosed in A. Sugimori, Chemistry of Organic Synthesis, 48, 788 (1990); A. Sugimori, Organometallics News, No. 1, 1990, pp. 2; and H. Boennemann, B. Bogdanovic, W. Brijoux, R. Brinkmann, M. Kajitani, R. Mynott, G.

S. Natrajan and M. G. Sanson, "Transition-Metal-Catalyzed Synthesis of Heterocyclic Compounds" in "Catalysis in Organic Reactions" edited by J. R. Kosak, Marcel Dekker, 1984, pp. 31–62. From these publications, however, the complexes are unknown for their function as singlet oxygen quenchers to dyes.

DETAILED DESCRIPTION OF THE INVENTION

Figure 1:
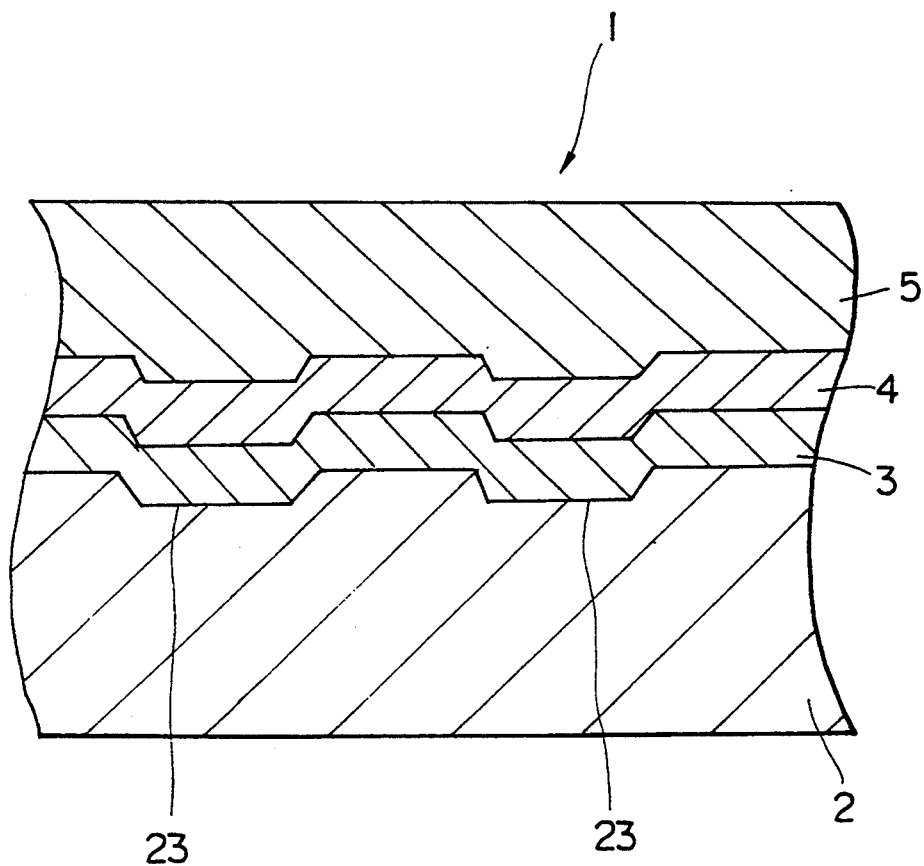
FIG. 1 is a fragmental cross-sectional view of an optical recording disk according to one embodiment of the invention.

The optical recording medium according to the present invention includes a recording layer which contains a dye and a quencher. In a first aspect, the quencher is a complex of formula (1) or a dimer thereof. The complex quencher has sufficient solubility to prepare a coating solution to be applied to form a dye film, offering the advantage of ease of film formation. The complex quencher is also effective for keeping the coexisting dye resistant against light and ensures sufficient reflectivity. Therefore, the invention is applicable to optical recording disks to meet the compact disk (CD) standards.

To obtain a high degree of modulation, preferred among the complex quenchers of formula (1) are complex quenchers of formula (2) wherein the center metal is Co. These cobalt complexes have a higher index of refraction (n) than the nickel complexes of formulae (4) and (5) shown later and copper complexes as shown by formulae (4) and (5) wherein the center metal is replaced by Cu.

Formula (1) is given below.

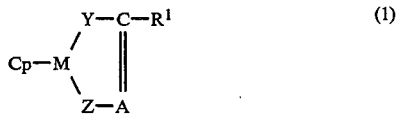

(1)

In formula (1), Cp is cyclopentadiene. The cyclopentadiene may have 1 to 5 substituents which include alkyl radicals, aryl radicals, ether radicals, ester radicals, acyl radicals, halogen atoms, cyano radicals, alkylthio radicals, sulfamoyl radicals, alkylsulfonyl radicals, and nitro radicals. The alkyl radicals my have a substituent and are preferably those having 1 to 4 carbon atoms, e.g., —$CH_3$, —$C_2H_5$, —$CF_3$, —$C_2F_5$, and —$C(CH_3)_2(CN)$. The aryl radicals may have a substituent and are preferably those having 6 to 10 carbon atoms, e.g., phenyl radical. The ether radicals may have a substituent, preferably an alkyl radical having 1 to 4 carbon atoms, e.g., —$OCH_3$ and —$OCF_3$. The ester radicals may have a substituent, preferably an alkyl radical having 1 to 4 carbon atoms, e.g., —$COOCH_3$ and —$COOC_2H_5$. The acyl radicals may have a substituent, preferably an alkyl radical having 1 to 4 carbon atoms, e.g., —$COCH_3$. The halogen atoms are F, Cl, Br, and I. The alkylthio radicals may have a substituent, preferably an alkyl radical having 1 to 4 carbon atoms, e.g., —$SCH_3$ and —$SCF_3$. The sulfamoyl radicals may have a substituent, e.g., —$SO_2NH_2$. The alkylsulfonyl radicals may have a substituent, preferably an alkyl radical having 1 to 4 carbon atoms, e.g., —$SO_2CH_3$ and —$SO_2CF_3$. Some of these substituents can concatenate to form a cycloalkane ring (e.g., cyclopentane) fused to the cyclopentadiene. Preferred substituents are alkyl, aryl, ether, ester and acyl radicals and halogen atoms. Of course, unsubstituted cyclopentadiene is also useful.

Y and Z which coordinate to the metal atom M may be identical or different and are S, Se, O or $NR^3$. Preferred combinations of Y+Z are S+S, Se+Se, S+Se, $NR^3+NR^3$, S+$NR^3$, and S+O. $R^3$ is a hydrogen atom, an alkyl radical or a phenyl radical. The alkyl radicals represented by $R^3$ may have a substituent such as an aryl and alkoxy radical and are preferably those having 1 to 10 carbon atoms, for example, methyl and ethyl. The phenyl radicals represented by $R^3$ may have a substituent such as an alkyl, aryl and alkoxy radical and are preferably those having 6 to 10 carbon atoms, for example, phenyl. Preferred $R^3$ is a hydrogen atom, ethyl radical or phenyl radical. For the combination of $NR^3+NR^3$, the two $R^3$ may be identical or different.

A forms a five-membered ring with X, Y and C-$R^1$ and represents C-$R^2$ or N.

$R^1$ and $R^2$ are independently selected from the group consisting of a hydrogen atom, halogen atom, alkyl radical, aryl radical, cyano radical, ether radical, ester radical, acyl radical, alkylthio radical, sulfamoyl radical, alkylsulfonyl radical, heterocyclic radical, and nitro radical. The radicals represented by $R^1$ and $R^2$ may have substituents, for example, halogen atoms such as fluorine and chlorine, nitro radicals, alkyl radicals having 1 to 4 carbon atoms, aryl radicals, alkoxy radicals in which the alkyl moiety has 1 to 4 carbon atoms, and substituted or unsubstituted amino radicals. Preferred radicals represented by $R^1$ and $R^2$ are hydrogen atoms, alkyl radicals having 1 to 4 carbon atoms (e.g., —$CH_3$, —$C_2H_5$, —$C_3H_7$, —$C_4H_9$, and —$CF_3$), ether radicals having a $C_1$-$C_4$ alkyl radical (e.g., —$OCH_3$ and —$OCF_3$), ester radicals having a $C_1$-$C_4$ alkyl radical (e.g., —$COOCH_3$ and —$COOC_2H_5$), acyl radicals having a $C_1$-$C_4$ alkyl radical (e.g., —$COCH_3$), alkylthio radicals having a $C_1$-$C_4$ alkyl radical (e.g., —$SCH_3$ and —$SCF_3$), sulfamoyl radicals (e.g., —$SO_2NH_2$), alkylsulfonyl radicals having a $C_1$-$C_4$ alkyl radical (e.g., —$SO_2CH_3$ and —$SO_2CF_3$), $NO_2$, CN, aryl radicals having 6 to 12 carbon atoms (e.g., phenyl, p-nitrophenyl, and p-aminophenyl radicals), 5- or 6-membered heterocyclic radicals which may have a fused ring (e.g., 2-pyridyl, 3-pyridyl, and 4-pyridyl radicals), and halogen atoms (e.g., F, Cl, and Br). Often $R^1$ and $R^2$ are identical although they may be different. Alternatively, $R^1$ and $R^2$, taken together, may form a ring, for example, an aromatic ring such as a benzene and naphthalene ring when A is C-$R^2$. To the ring may be attached a substituent such as an alkyl radical, aryl radical, halogen atom, substituted or unsubstituted amino radical, alkoxy radical, and nitro radical.

M is a metal atom, for example, Co, Ni, Pt, Zn, Cu, and Rh.

The complex of formula (1) may take the form of a dimer as shown by the following formula (3).

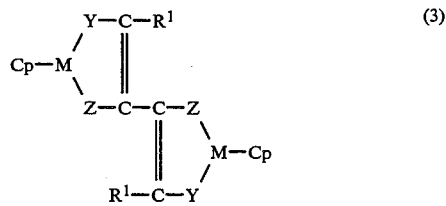

(3)

In formula (3), Cp, Y, Z, and $R^1$ are as defined above.

Preferred among the complex quenchers of formula (1) are those of formula (2).

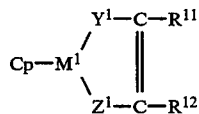

In formula (2), Cp is cyclopentadiene as defined for formula (1). The cyclopentadiene may have a substituent, and general and preferred examples of the substituent are as defined for formula (1). Specifically, preferred substituents are substituted or unsubstituted alkyl radicals having 1 to 4 carbon atoms (e.g., $-CH_3$, $-C_2H_5$, $-CF_3$, and $-C(CH_3)_2(CN)$), ester radicals having a substituted or unsubstituted $C_1$-$C_4$ alkyl radical (e.g., $-COOCH_3$), acyl radicals having a substituted or unsubstituted $C_1$-$C_4$ alkyl radicals (e.g., $-COCH_3$), alkoxy radicals having a substituted or unsubstituted $C_1$-$C_4$ alkyl radicals (e.g., $-OCH_3$ and $-OCF_3$), and halogen atoms (e.g., F).

$M^1$ is cobalt, nickel or rhodium, especially cobalt.

$Y^1$ and $Z^1$, which may be identical or different, are S, Se or $NR^3$. Preferred combinations of $Y^1 + Z^1$ are S+S, Se+Se, S+Se, $NR^3 + NR^3$, and $S + NR^3$. $R^3$ is as previously defined with respect to its general and preferred examples.

$R^{11}$ and $R^{12}$ are independently a hydrogen atom or a monovalent substituent having a Hammett's $\sigma$ value of at least 0. Illustrative examples are those among the radicals represented by $R^1$ and $R^2$ in formula (1) which have a Hammett's $\sigma$ value of at least 0, including $-CF_3$, $-CN$, $-OCF_3$, $-COOCH_3$, $-COOC_2H_5$, $-SCF_3$, $-NO_2$, $-SO_2NH_2$, $-SO_2CH_3$, halogen atoms and hydrogen atoms Alternatively, $R^{11}$ and $R^{12}$ taken together may form a ring. The ring itself and its substituent are the same as the ring formed by $R^1$ and $R^2$ and its substituent which are described above.

Preferred among the complex quenchers of formula (1) including those of formula (2) are those in which the ring formed by M, Y, Z, C and A in formula (1) or $M^1$, $Y^1$, $Z^1$, C and C in formula (2) is aromatic. The fact that the ring is aromatic is ascertained by the chemical shift ($\delta$) value of $^{13}C$ of cyclopentadiene as measured by $^{13}$C-NMR, the reducing half-wave potential ($E^r_{\frac{1}{2}}$) value of a polarogram or the like.

For example, a dithiol ring in which both Y and Z (or $Y^1$ and $Z^1$) are sulfur showed a $E^r_{\frac{1}{2}}$ value of $-1.8$ to 0 V and a $^{13}C$ $\delta$ value of 75 to 90 ppm. Plotting $\delta$ values relative to $E^r_{\frac{1}{2}}$ values gave a linear relationship having a gradient $\Delta(\delta/E^r_{\frac{1}{2}})$ in the range of 2.0 to 15.0 ppm/V. It is to be noted that the $E^r_{\frac{1}{2}}$ value was determined by measuring a potential relative to a reference electrode (Ag|0.1 mol.dm$^{-3}$ AgClO$_4$) in acetonitrile at 25° C. while using tetraethylammonium perchlorate (TEAP) as a supporting electrolyte.

When light resistance is taken into account, it is preferred that the substituent on Cp have a Hammett's $\sigma$ value of at least 0 and both the substituents represented by $R^1$ and $R^2$ (or $R^{11}$ and $R^{12}$) have a Hammett's $\sigma$ value of at least 0.

Illustrative, but non-limiting, examples of the complex quencher of formula (1) are shown in the following List of Complexes. Throughout the list, Cp represents cyclopentadiene, Cp-($CH_3$) or the like represents cyclopentadiene having a methyl or another substituent, and Ph represents a phenyl radical.

List of Complexes

| Complex No. | Cp | M | Y—C—R₁ ‖ Z—A |
|---|---|---|---|
| 1 | Cp* | Co | S\C(=C)/CH₃, S/ \CH₃ |
| 2 | Cp | Co | S\C(=C)/Ph, S/ \Ph (fused phenyls) |
| 3 | Cp | Co | S, S (benzene-fused) |
| 4 | Cp | Co | S\C(=C)/CN, S/ \CN |
| 5 | Cp | Co | S\C(=C)/COOCH₃, S/ \COOCH₃ |
| 6 | Cp⁺(CH₃)** | Co | S\C(=C)/CH₃, S/ \CH₃ |
| 7 | Cp | Co | S\C(=C)/CF₃, S/ \CF₃ |
| 8 | Cp | Co | S\C(=C)/C₄H₉, S/ \C₄H₉ |
| 9 | Cp | Co | S\C(=C)/C₃H₇, S/ \C₃H₇ |
| 10 | Cp | Co | S\C(=C)/Ph—OCH₃*, S/ \Ph—OCH₃ |

-continued

List of Complexes

| Complex No. | Cp | M | Y—C—R₁ / Z—A |
|---|---|---|---|
| 11 | Cp | Co | S-C(=C)(Ph(OCH₃)₂)-S ... Ph(OCH₃)₂ (dithiolene with two Ph(OCH₃)₂ groups) |
| 12 | Cp | Co | S-C(=C)(Ph(OCH₃)₃)-S ... Ph(OCH₃)₃ |
| 13 | Cp | Co | benzodioxole-fused dithiolene |
| 14 | Cp | Co | 3,4-dithio-toluene (S,S-benzene with CH₃) |
| 15 | Cp | Co | 3,4-dithio-(t-C₄H₉)benzene |
| 16 | Cp | Co | 3,4-dithio-chlorobenzene |
| 17 | Cp | Co | 3,4-dithio-dichlorobenzene |
| 18 | Cp | Co | 3,4-dithio-trichlorobenzene |
| 19 | Cp | Co | 3,4-dithio-N(CH₃)₂-benzene |

-continued

List of Complexes

| Complex No. | Cp | M | Y—C—R₁ / Z—A |
|---|---|---|---|
| 20 | Cp | Co | 1,2-diaminobenzene (NH, NH) |
| 21 | Cp | Co | NH-C(CH₃)=C(CH₃)-NH |
| 22 | Cp | Co | S,S / S,S dithiolene with C=S |
| 23 | Cp(CH₃)* | Co | S,S / S,S dithiolene with C=S |
| 24 | Cp | Co | dinuclear: S-C(Ph)=C(S-)-C(=)(S)-C(Ph)(S)-M-Cp |
| 25 | Cp | Co | S-C(Ph)=N-S |
| 26 | Cp | Co | 1-thio-2-oxo-naphthalene |
| 27 | Cp | Co | 2-thio-aniline (S, NH) |

-continued

List of Complexes

| Complex No. | Cp | M | Y—C—R₁ / Z—A |
|---|---|---|---|
| 28 | Cp | Co | N(C₂H₅)-C₆H₄-N(C₂H₅) (o-phenylenediamine N,N'-diethyl) |
| 29 | Cp | Co | 1-oxo-2-thio-naphthalene (O and S on adjacent positions of naphthalene) |
| 30 | Cp | Cu | S-C(CH₃)=C(CH₃)-S |
| 31 | Cp | Cu | S-C(Ph)=C(Ph)-S |
| 32 | Cp | Cu | 1,2-benzenedithiolate (S,S-C₆H₄) |
| 33 | Cp | Ni | S-C(CH₃)=C(CH₃)-S |
| 34 | Cp | Pt | S-C(Ph)=C(Ph)-S |
| 35 | Cp | Zn | 1,2-benzenedithiolate |
| 36 | Cp | Rh | S-C(CH₃)=C(CH₃)-S |
| 37 | Cp(COOCH₃) | Co | S-C(CN)=C(CN)-S |
| 38 | Cp(COCH₃) | Co | S-C(COOCH₃)=C(COOCH₃)-S |
| 39 | Cp | Ni | S-CH=CH-S |
| 40 | Cp | Pt | S-CH=C(Ph)-S |
| 41 | Cp | Zn | S-CH=C(4-NO₂-C₆H₄)-S |
| 42 | Cp | Rh | S-CH=C(2-pyridyl)-S |
| 43 | Cp | Co | S-CH=C(3-pyridyl)-S |
| 44 | Cp | Co | S-CH=C(COOC₂H₅)-S |
| 45 | Cp | Ni | S-C(Ph)=C(4-NH₂-C₆H₄)-S |

-continued
List of Complexes
| Complex No. | Cp | M | Y—C—R1 / Z—A |
|---|---|---|---|
| 46 | Cp | Pt | 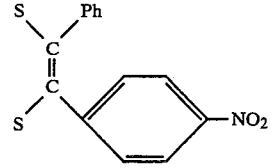 |
| 47 | Cp | Zn | 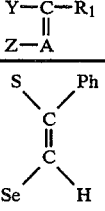 |
| 48 | Cp | Rh | 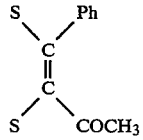 |
| 49 | Cp | Co | 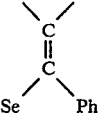 |
| 50 | Cp | Co | 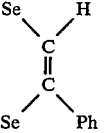 |
| 51 | Cp | Co | 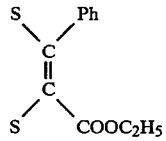 |
| 52 | Cp | Co | 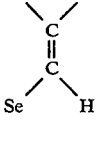 |
| 53 | Cp | Co |  |
| 54 | Cp | Co | 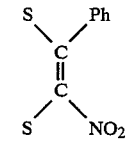 |
| 55 | Cp | Co | 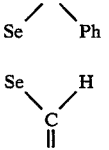 |
| 56 | Cp | Co | 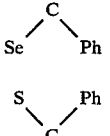 |
| 57 | Cp | Co | 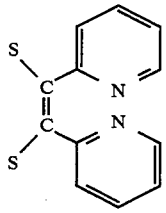 |
| 58 | Cp | Co | 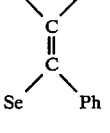 |
| 59 | Cp | Co | 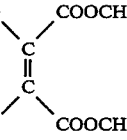 |
| 60 | Cp | Co | 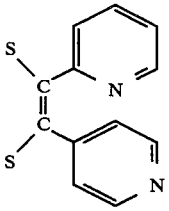 |
| 61 | Cp | Co | 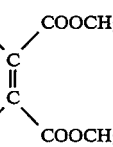 |
| 62 | Cp($CH_3$) | Co | 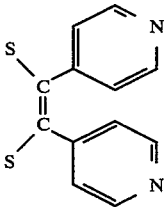 |
| 63 | 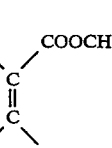 | Co | 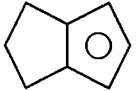 |

-continued
List of Complexes

| Complex No. | Cp | M | $\begin{array}{c}Y-C-R_1\\ \parallel \\ Z-A\end{array}$ |
|---|---|---|---|
| 64 | Cp(CH$_3$)$_5$ | Co | S–C(Ph)=C(Ph)–S |
| 65 | Cp(CH$_3$)$_5$ | Co | S–C(COOCH$_3$)=C(COOCH$_3$)–S |
| 66 | Cp(CH$_3$)$_5$ | Co | S–C(CN)=C(CN)–S |
| 67 | Cp(C$_2$H$_5$) | Co | S–C(COOCH$_3$)=C(COOCH$_3$)–S |
| 68 | Cp(COCH$_3$) | Co | S–C(H)=C(Ph)–S |
| 69 | Cp(COCH$_3$) | Co | S–C(Ph)=C(Ph)–S |
| 70 | Cp | Rh | S–C(Ph)=C(Ph)–S |
| 71 | Cp | Rh | S–C(Ph)=C(Ph)–S |
| 72 | Cp | Rh | S–C(CN)=C(CN)–S |
| 73 | Cp | Co | S–C(CF$_3$)=C(CN)–S |
| 74 | Cp | Co | S–C(CF$_3$)=C(COOCH$_3$)–S |
| 75 | Cp | Co | S–C(COOCH$_3$)=C(CF$_3$)–S |
| 76 | Cp(OCH$_3$) | Co | S–C(CN)=C(CN)–S |
| 77 | Cp(F) | Co | S–C(CN)=C(CN)–S |
| 78 | Cp(CF$_3$) | Co | S–C(CN)=C(CN)–S |
| 79 | Cp | Co | HN–C(CN)=C(CN)–NH |
| 80 | Cp(CH$_3$) | Co | HN–C(CN)=C(CN)–NH |
| 81 | Cp(CF$_3$) | Co | HN–C(CN)=C(CN)–NH |
| 82 | Cp(COCH$_3$) | Co | HN–C(CN)=C(CN)–NH |

List of Complexes

| Complex No. | Cp | M | Y—C—R₁ ‖ Z—A |
|---|---|---|---|
| 83 | Cp(COOCH₃) | Co | H\N—C(CN)=C(CN)—N\H |
| 84 | Cp(CH₃) | Co | benzene with two NH groups (o-phenylenediamine) |
| 85 | Cp(COCH₃) | Co | benzene with two NH groups |
| 86 | Cp(COOCH₃) | Co | benzene with two NH groups |
| 87 | Cp(CF₃) | Co | benzene with two NH groups |
| 88 | Cp | Co | C₂H₅\N—C(CN)=C(CN)—N\C₂H₅ |
| 89 | Cp | Co | Ph\N-benzene-N\H |
| 90 | Cp | Co | Ph\N—C(CN)=C(CN)—N\Ph |
| 91 | Cp | Co | H\N-(4-nitrobenzene)-N\H |
| 92 | Cp(C(CH₃)₂CN) | Co | S\C(CN)=C(CN)\S |

The metal complexes of formula (1) can be readily synthesized by the methods disclosed in the above-referred publications or analogous methods. More particularly, metal cyclopentadienyls are synthesized and then oxidized with ethylene dithiol. For example, complex No. 4 in the List was synthesized according to the following reaction scheme by the following procedure.

$$Co_2(CO)_8 + 2C_5H_6 \longrightarrow 2CpCo(CO)_2 + 4CO +$$

$$H_2CpCO(CO)_2 + I_2 \longrightarrow CpCoI_2(CO) + CO$$

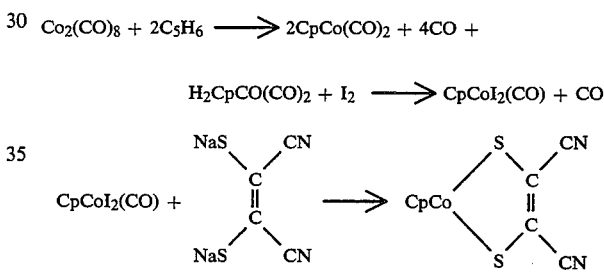

A cobalt complex such as octacarbonylcobalt [$Co_2(CO)_8$] was mixed with cyclopentadiene ($C_5H_6$) in a molar ratio of 1:3 in a solvent such as benzene. Reaction was continued at room temperature for about 1½ hours and then at about 50° C. for about 17½ hours. After the completion of reaction, the reaction solution was filtered and the reaction product $CpCo(CO)_2$ was then separated by vacuum distillation. This was a red brown liquid. Next, with stirring, equal molar amounts of $CpCo(CO)_2$ and $I_2$ were dissolved in dry ether in an inert gas atmosphere such as argon. The solution was allowed to stand for about one hour and then cooled with ice for about 30 minutes, yielding $CpCoI_2(CO)$ as a black powder. Further, equal molar amounts of $CpCoI_2(CO)$ and $Na_2S_2C_2(CN)_2$ were mixed in a solvent such as an acetone-methanol mixture in an inert gas atmosphere such as argon. The solution was stirred for about 5 hours for reaction. Separation and purification yielded the end product as a black brown powder.

Complex No. 79 or 91 in the List was synthesized by forming $CpCoI_2(CO)$ by the same procedure as above, and then reacting it with $(NH_2)_2C_2(CN)_2$ or 1,2-diamino-4-nitrobenzene according to the following scheme. This reaction is preferably carried out in the presence of a base such as triethylamine.

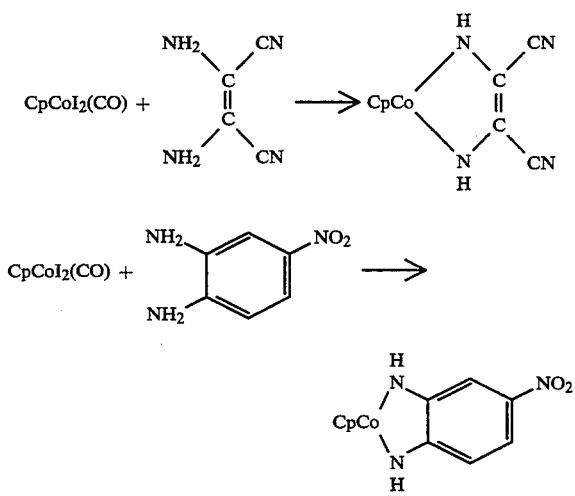

The remaining compounds can be synthesized by similar procedures. These compounds are identifiable with NMR spectrum or mass spectrum.

When used as a quencher, the complex of formula (1) should preferably have absorption maximum at a wavelength of 600 nm or shorter, especially from 400 to 600 nm because within this range, it has no influence on the absorption characteristics of the coexisting dye, that is, it causes no lowering of reflectivity or no lowering of reproduced output.

The light absorbing dyes used herein preferably have maximum absorption at a wavelength in the range of from 600 to 900 nm, more preferably from 600 to 800 nm, most preferably from 650 to 750 nm. Such a light absorbing dye is preferably selected from cyanine dyes, phthalocyanine dyes, naphthalocyanine dyes, anthraquinone dyes, azo dyes, triphenylmethane dyes, pyrylium dyes, thiapyrylium dyes, squalirium dyes, chroconium dyes, and metal complex dyes alone or in admixture of two or more. Preferred cyanine dyes are cyanine dyes having an indolenine ring which may have a fused aromatic ring, especially a benzoindolenine ring. Many cyanine dyes each have two indolenine rings which may have different fused states. Preferred dyes used in the recording layer are described in the previously cited patent publications.

The complex quencher of formula (1) should preferably be added in an amount of about 0.1 to about 10 mol per mol of the light absorbing dye or dyes. In addition to the quencher of formula (1), any of other well-known quenchers may be used if desired.

In the practice of the invention, the recording layer is often formed by spin coating, more particularly by dissolving the dye and quencher in a suitable organic solvent and applying and spreading the coating solution on a substrate while rotating the substrate. The coating is dried after spin coating, if desired. The organic solvent used herein may be selected from alcohols, ketones, esters, ethers, aromatics, and alkyl halides, depending on a particular dye used. Alcohols can be used since the quencher has a solubility of 3% or higher therein. Preferably the coating solution contains about 2 to 15% by weight, more preferably about 2 to 10% by weight of the dye and about 0.5 to 10% by weight, more preferably about 1 to 8% by weight of the quencher. The coating solution may further contain additives such as binders, dispersants, and stabilizers.

The recording layer thus formed has a thickness which may be suitably selected in accordance with a desired reflectivity or the like although it is usually about 500 to 3,000 Å.

In another aspect of the invention, the complex of formula (1) is used as the dye. In this embodiment, the complex of formula (1) has the dual function of dye and quencher. Preferred examples are complex Nos. 20-23, 28, and 79-91 in the aforementioned List. On use as the dye, the coating solution should preferably contain about 2 to 15% by weight, more preferably about 2 to 10% by weight of the complex of formula (1).

Referring to FIG. 1, there is schematically illustrated an optical recording disk according to one embodiment of the invention. The optical recording disk 1 shown in FIG. 1 is of the close contact type having a reflective layer in close contact with a recording layer which can be read in accordance with the CD standards. The disk 1 includes a dye base recording layer 3 on one surface of a substrate or support 2. Also included are a reflective layer 4 and a protective layer 5 stacked on the recording layer 3 in close arrangement.

The substrate 2 is of conventional disk shape and has commonly used dimensions, for example, a thickness of about 1.2 mm and a diameter of about 64 to 200 mm.

The substrate 2 is formed of a resin or glass material which is substantially transparent to recording and reading light, typically a semiconductor laser beam having a wavelength of 600 to 900 nm, especially 770 to 900 nm, most often 780 nm. The substrate material preferably has a transmittance of at least 88% so that recording and reading operation can be made through the substrate 2, that is, from the rear surface of the substrate 2 remote from the recording layer 3.

Preferably, the substrate 2 is formed of resins, typically thermoplastic resins such as polycarbonate resin, acrylic resins, amorphous polyolefins, TPX, and polystyrene using conventional techniques such as injection molding. On the surface of the substrate 2 where the recording layer 3 is formed, the upper surface in the illustrated embodiment, a predetermined pattern, typically a groove 23 is formed for tracking and addressing purposes. It is preferred that the groove 23 is formed at the same time as molding of the substrate itself. Alternatively, a resin layer (not shown) having a predetermined pattern including grooves may be formed on the substrate by 2P method or the like. Glass substrates are acceptable as the case may be.

The tracking groove 23 preferably consists of continuous spiral turns. Typically, the groove has a depth of 0.1 to 0.25 μm and a width of 0.35 to 0.50 μm (width in a radial direction with respect to the disk center). The adjoining groove turns are separated by a land at a pitch of 1.5 to 1.7 μm. This groove configuration permits tracking signals to be obtained without reducing the reflection level of the groove. It is important to restrict the groove width within the range of 0.35 to 0.50 μm. It would become difficult to obtain tracking signals of sufficient magnitude from a groove of less than 0.35 μm in width, and then a slight tracking offset during recording can lead to increased jitter. A groove of more than 0.50 μm in width would often cause reproduction signals to be distorted in waveform, resulting in increased crosstalk.

The recording layer 3 is formed on the grooved substrate 2 in FIG. 1 by applying a dye-containing solution, preferably by a spin coating technique as previously described. Spin coating can occur from the inner periphery to the outer periphery under conventional conditions while rotating the substrate at about 500 rpm to 5,000 rpm. The recording layer thus formed generally has a thickness of 500 to 3,000 Å (=50 to 300 nm) in dry film state. Outside the range, reflectivity is too low to enable reproduction in accordance with the CD standards. A higher degree of modulation is expected particularly when the recording layer 3 in the groove 23, that is, the recording track has a thickness of at least 1,000 Å (=100 nm), especially 1,500 to 3,000 Å (=150 to 300 nm).

For CD signal recording, the recording layer preferably has a coefficient of extinction (the imaginary part of a complex index of refraction) k of from 0.02 to 0.05 at the wavelength of recording and reading light. With k<0.02, the recording layer can have a lower absorptivity so that it might become difficult to record with a commonly used power. A coefficient of extinction k of more than 0.05 can result in a drop of reflectivity to below 70%, often failing to reproduce according to the CD standard. The recording layer preferably has an index of refraction (the real part of a complex index of refraction) n of from 2.0 to 2.6 at the wavelength of recording and reading light. With n<2.0, the reflectivity and reproduction signal magnitude would be reduced, often failing to read by CD players.

As shown in FIG. 1, the reflective layer 4 is formed on the recording layer 3 in direct contact therewith. Often the reflective layer is formed of high reflectivity metal and alloys such as Au, Cu and alloys thereof, using evaporation, sputtering and other well-known techniques. It preferably has a thickness of at least 500 Å. The upper limit of thickness is not critical although the upper limit is usually about 1,200 Å when the application cost and time are taken into account. With these considerations, the reflective layer alone has a reflectivity of at least 90%, and the reflectivity of an unrecorded portion of an optical recording medium through the substrate can be at least 60%, especially at least 70%.

Also as shown in FIG. 1, the protective layer 5 is formed on the reflective layer 4. The protective layer is formed of various resins such as UV-curable resins, generally to a thickness of about 0.5 to 100 μm. The protective layer may be a coating or a preformed sheet. The protective coating can be formed by conventional techniques including spin coating, gravure coating, spraying and dipping.

The optical recording medium of the invention is not limited to the close contact type optical recording disk shown in FIG. 1, but applicable to any desired optical recording medium having a recording layer containing a dye. For example, the invention is applicable to pit formation type optical recording disks having the air sandwich structure with equivalent results.

EXAMPLE

Examples of the present invention are given below by way of illustration and not by way of limitation.

Example 1

First several complexes were examined for solubility in methanol at 25° C., with the results shown in Table 1. The complexes on tests were Complex Nos. 1, 2, 3, 4, and 5 in the List of Complexes and comparative complexes of formulae (4) and (5) shown below.

Formula (4):

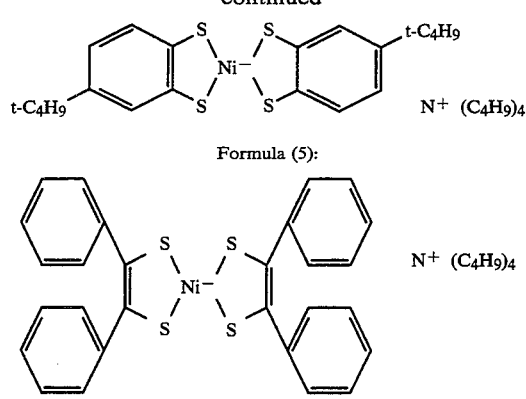

Formula (5):

N+ (C4H9)4

TABLE 1

| Disk No. | Metal complex No. | Solubility in methanol (wt %) | Reflectivity (%) | Dye retention (%) |
|---|---|---|---|---|
| 1 | 1 | 3.5 | 73 | ≧80 |
| 2 | 2 | 3.0 | 72 | ≧80 |
| 3 | 3 | 3.3 | 71 | ≧80 |
| 4 | 4 | 3.2 | 74 | ≧80 |
| 5 | 5 | 4.0 | 73 | ≧80 |
| 11 | formula (4) | 0.7 | 45 | ≧80 |
| 12 | formula (5) | 0.3 | 48 | ≧80 |
| 13 | — | — | 72 | 35 |

Optical recording disk samples of the structure shown in FIG. 1 were fabricated by first forming a dye-containing recording layer on amorphous polyolefin substrates of 120 mm in diameter and 1.2 mm in thickness by spin coating, forming a reflective layer on the recording layer, and finally forming a protective layer on the reflective layer.

The coating solution used in forming the recording layer contained 4% by weight of a dye and 2% by weight of a quencher complex in an organic solvent. The dye was an indolenine cyanine dye of the following formula (6).

Formula (6):

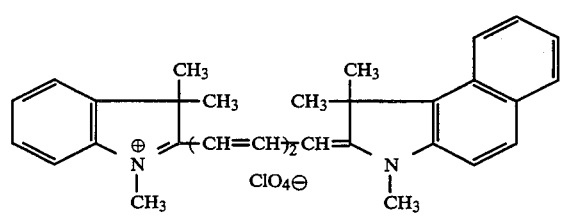

The organic solvent was cyclohexanone. The recording layer was 200 nm thick. The reflective layer was of Au and formed by sputtering to a thickness of 85 nm. The protective layer was of UV cured acrylic resin and had a thickness of 5 μm.

Each of the disk samples was measured for reflectivity at 780 nm, with the results shown in Table 1. As seen from Table 1, the complex quenchers within the scope of the invention are free from a lowering of reflectivity. This is because the comparative quenchers of formulae (4) and (5) have absorption maximum at a wavelength of 900 nm and 950 nm, respectively, whereas Complex Nos. 4 and 5 have absorption maximum at a shorter wavelength of 560 nm and 550 nm, respectively, There were similarly fabricated samples without the reflective layer. Their initial transmittance To was measured. The samples were exposed to a Xenon lamp at 80,000 lux for 10 hours. The samples after exposure were measured for transmittance T again. The dye retention was calculated according to $(100-T)/(100-T_0) \times 100\%$. The results are also shown in Table 1. The sample without the quencher (Disk No. 13) showed a dye retention of 35% whereas at least 80% of the dye survived in all of Disk Nos. 1-5, 11 and 12. With respect to dye retention, the complex quenchers according to the invention are equally effective to the conventional quenchers.

Example 2

Disk samples, Nos. 21-25, were fabricated by the same procedure as in Example 1 except for the following changes. The substrates used were of polycarbonate. The complex quenchers in the recording layer were changed to Complex Nos. 5, 37, 38, 7, and 73 in the List of Complexes. In the coating solution for forming the recording layer, the solvent was diacetone alcohol, the total content of the dye and complex quencher was 6% by weight and the content of the complex quencher was 1.8% by weight.

For comparison purposes, a disk sample No. 14 was fabricated by the same procedure as sample No. 12 except that the quencher of formula (5) was replaced by a chemically bound dye-quencher combination wherein the dye formed a salt with a complex having Cu as the center metal.

Complex Nos. 5, 37, 38, 7, and 73 all had absorption maximum at a wavelength of less than 600 nm and good solubility in methanol.

These disk samples, Nos. 21-25 and 14, were measured for reflectivity at 780 nm. Also the dye retention was determined by the same procedure as in Example 1 except that the xenon lamp exposure time was extended to 50 hours. In addition, a degree of modulation upon recording with optimum power was measured.

The results are shown in Table 2. For convenience's sake, the results of sample Nos. 12 and 13 are also shown in Table 2.

TABLE 2

| Disk No. | Metal complex No. | Dye retention (%) | Reflectivity (%) | Degree of modulation |
|---|---|---|---|---|
| 21 | 5 | ≧80 | 70 | 80 |
| 22 | 37 | ≧80 | 68 | 85 |
| 23 | 38 | ≧80 | 69 | 83 |
| 24 | 7 | ≧80 | 70 | 82 |
| 25 | 73 | ≧80 | 70 | 82 |
| 12 | formula (5) | ≧80 | 48 | 60 |
| 13 | — | 35 | 72 | 83 |
| 14 | combined dye | ≧80 | 70 | 72 |

As seen from Table 2, the complex quenchers within the scope of the invention ensure good light resistance, satisfactory reflectivity and a high degree of modulation.

Example 3

Disk samples, Nos. 31-33, were fabricated by the same procedure as in Example 2 except that the complex quencher used 80 in the recording layer was replaced by complex Nos. 20, 79 and in the List of Complexes. In the coating solution for forming the recording layer, the solvent was diacetone alcohol, the total content of the dye and complex quencher was 6% by weight, and the content of the complex quencher was 1.8% by weight.

These disk samples were measured for reflectivity at 780 nm. Also the dye retention was determined by the same procedure as in Example 1 except that the xenon lamp exposure time was extended to 50 hours. In addition, a degree of modulation upon recording with optimum power was measured.

The results are shown in Table 3 together with the solubility of the complexes in methanol at 25° C. For convenience's sake, the results of sample Nos. 12 and 13 are also shown in Table 3.

TABLE 3

| Disk No. | Metal complex No. | Solubility in methanol (wt %) | Reflectivity (%) | Dye retention (%) | Degree of modulation |
|---|---|---|---|---|---|
| 31 | 20 | ≧4 | 75 | ≧80 | 85 |
| 32 | 79 | 4 | 75 | ≧80 | 83 |
| 33 | 80 | ≧4 | 75 | ≧80 | 84 |
| 12 | formula (5) | 0.3 | 48 | ≧80 | 60 |
| 13 | — | — | 72 | 35 | 83 |

As seen from Table 3, the complex quenchers within the scope of the invention have high solubility and ensure good light resistance, satisfactory reflectivity and a high degree of modulation.

Example 4

A disk sample, No. 41, was fabricated by the same procedure as in Example 1 except for the following changes. The dye in the recording layer was changed to Complex No. 22 in the List of Complexes. In the coating solution for forming the recording layer, the solvent was cyclohexanone and the content of the complex dye was 6% by weight.

This disk sample, No. 41, was measured for reflectivity at 780 nm. Also the dye retention was determined by the same procedure as in Example 1 over the exposure time of 10 hours. The results were satisfactory and comparable to the disk samples within the scope of the invention in Example 1.

The use of a specific complex as the quencher according to the present invention have several benefits. While the complex is effective for preventing deterioration by reproduction and optical deterioration as in the prior art, it is easy to coat because of improved solubility, prevents any lowering of reflectivity, and offers a higher degree of modulation. The complex can also be used as the dye/quencher with similar benefits.

Although the hereinabove described embodiment of the present invention constitutes a preferred embodiment of the invention, it should be understood that modifications can be made thereto without departing from the scope of the invention as set forth in the appended claims.

We claim:

1. An optical recording medium comprising on a substrate a recording layer which contains a dye and a quencher, the quencher being a complex of the formula (1) or a dimer thereof:

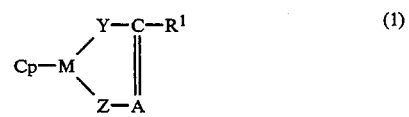

wherein

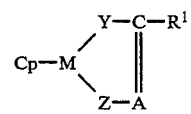

(1)

wherein
Cp is cyclopentadiene,
A is C-R² or N,
R¹ and R² are independently selected from the group consisting of a hydrogen atom, halogen atom, alkyl, aryl, cyano, ether, ester, acyl, alkylthio, sulfamoyl, alkylsulfonyl, heterocyclic, and nitro radical, or R¹ and R² taken together may form a ring when A is C-R²,
Y and Z are independently selected from the group consisting of S, Se, O and NR³ wherein R³ is a hydrogen atom, alkyl or phenyl radical, and
M is a metal atom selected from the group consisting of Co, Ni, Pt, Zn, Cu and Rh,
said recording layer being formed by coating an alcohol solution of the dye and the quencher.

2. The optical recording medium of claim 1 wherein in formula (1), the cyclopentadiene represented by Cp has at least one substituent selected from the group consisting of an alkyl, aryl, ether, ester, acyl radical and halogen atom.

3. The optical recording medium of claim 1 wherein said quencher is a complex of the formula (2):

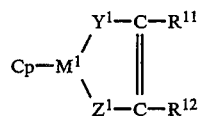

(2)

wherein
Cp is cyclopentadiene,
Y¹ and Z¹ are independently S, Se or NR³ wherein R³ is a hydrogen atom, alkyl or phenyl radical,
R¹¹ and R¹² are independently a hydrogen atom or a monovalent substituent having a Hammett's σ value of at least 0, or R¹¹ and R¹² taken together may form a ring, and
M¹ is Co, Ni or Rh.

4. The optical recording medium of claim 1 wherein said dye is a cyanine dye.

5. The optical recording medium of claim 4 wherein said cyanine dye has an indolenine ring.

6. The optical recording medium of any one of claims 1 to 5 wherein said dye has absorption maximum at 600 to 900 nm.

7. The optical recording medium of claim 1, wherein said quencher has a solubility of at least 3% by weight in methanol.

8. An optical recording medium comprising on a substrate a recording layer which contains a dye, the dye being a complex of the formula (1) or a dimer thereof:

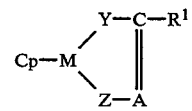

(1)

wherein
Cp is cyclopentadiene,
A is C-R² or N,
R¹ and R² are independently selected from the group consisting of a hydrogen atom, halogen atom, alkyl, aryl, cyano, ether, ester, acyl, alkylthio, sulfamoyl, alkylsulfonyl, heterocyclic, and nitro radical, or R¹ and R² taken together may form a ring when A is C-R²,
Y and Z are independently selected from the group consisting of S, Se, O and NR³ wherein R³ is a hydrogen atom, alkyl or phenyl radical, and
M is a metal atom selected from the group consisting of Co, Ni, Pt, Zn, Cu and Rh,
said recording layer being formed by coating an alcohol solution of the dye.

9. The optical recording medium of claim 8, wherein said dye has a solubility of at least 3% by weight in methanol.

10. An optical recording medium comprising on a substrate a recording layer which contains a dye and a quencher, the quencher being a complex of the formula (1) or a dimer thereof:

(1)

$$\text{Cp—M} \begin{matrix} \text{Y—C—R}^1 \\ \parallel \\ \text{Z—A} \end{matrix}$$

wherein
Cp is cyclopentadiene,
A is C-R² or N,
R¹ and R² are independently selected from the group consisting of a hydrogen atom, halogen atom, alkyl, aryl, cyano, ether, ester, acyl, alkylthio, sulfamoyl, alkylsulfonyl, heterocyclic, and nitro radical, or R¹ and R² taken together may form a ring when A is C-R²,
Y and Z are independently selected from the group consisting of S, Se, O and NR³ wherein R³ is a hydrogen atom, alkyl or phenyl radical, and
M is a metal atom selected from the group consisting of Co, Ni, Pt, Zn, Cu and Rh, and
said quencher having a solubility of at least 3% by weight in methanol.

* * * * *